United States Patent [19]

Tabata et al.

[11] Patent Number: 4,488,242
[45] Date of Patent: Dec. 11, 1984

[54] ROBOT ARM CONTROL METHOD USING OPEN LOOP CONTROL IN COMBINATION WITH CLOSED LOOP CONTROL

[75] Inventors: Fumio Tabata, Yokohama; Kazuo Asakawa, Kawasaki; Hitoshi Komoriya, Machida, all of Japan

[73] Assignee: Fujitsu Limited, Kawasaki, Japan

[21] Appl. No.: 333,056

[22] Filed: Dec. 21, 1981

[30] Foreign Application Priority Data

Dec. 22, 1980 [JP] Japan ................................ 55-182458

[51] Int. Cl.³ ...................... G06F 15/46; G05B 19/22
[52] U.S. Cl. ..................................... 364/513; 364/165; 364/182; 318/561; 318/568; 318/594
[58] Field of Search ............... 318/561, 568, 590, 591, 318/592, 593, 594, 574, 578; 364/513, 164, 165, 180, 182

[56] References Cited

U.S. PATENT DOCUMENTS

| | | | |
|---|---|---|---|
| 2,829,322 | 4/1958 | Silva | 318/561 |
| 3,412,300 | 11/1968 | Westenskow | 318/561 |
| 3,727,119 | 4/1973 | Stanley et al. | 318/568 |
| 3,845,378 | 10/1974 | Hendrickson et al. | 318/685 |
| 4,017,721 | 4/1977 | Michaud | 364/513 |
| 4,200,827 | 4/1980 | Oswald | 318/561 |
| 4,221,997 | 9/1980 | Flemming | 318/574 |
| 4,243,923 | 1/1981 | Whitney et al. | 364/513 X |
| 4,250,438 | 2/1981 | Onoda | 318/561 |
| 4,328,450 | 5/1982 | Gabor | 318/561 |

FOREIGN PATENT DOCUMENTS 2029603 3/1980 United Kingdom .

OTHER PUBLICATIONS

*Soviet Invention Illustrated Derwent*, week C17, published Jun. 4, 1980, London, GB.

*Primary Examiner*—Jerry Smith
*Assistant Examiner*—Allen MacDonald
*Attorney, Agent, or Firm*—Staas & Halsey

[57] ABSTRACT

A method for controlling the locus of an arm of an arm type robot or the like, wherein a control system which drives a first arm of a two-joint arm under open-loop control and a second arm under feedback control is provided. A bang-bang drive system is used for positioning the first arm in a minimum time. The position of the tip of the second arm can be detected either from the rotational angle of each arm or by means of a position recognizing device. Furthermore, an arm positioning method for rapidly bringing the tip of a multi-joint arm to a desired position while detecting the positions of its tip and its joints by simple calculations is disclosed.

9 Claims, 28 Drawing Figures

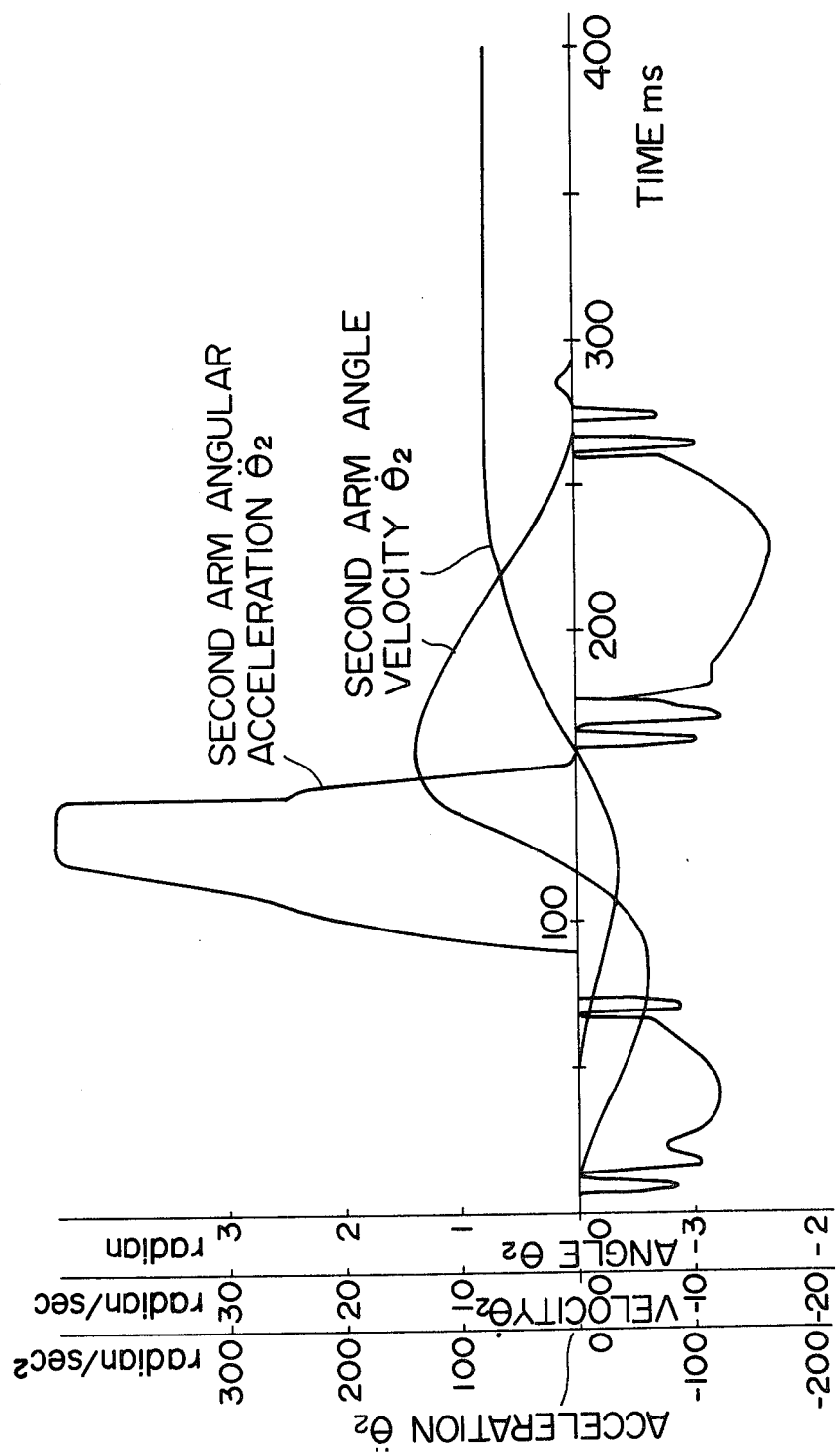

ROBOT ARM CONTROL METHOD USING OPEN LOOP CONTROL IN COMBINATION WITH CLOSED LOOP CONTROL

BACKGROUND OF THE INVENTION

1. Field of the Invention

The present invention relates to a method for controlling the locus of an arm of an arm-type robot or the like.

2. Description of the Prior Art

Since a multi-joint, arm-type robot has a high degree of freedom, is able to perform complex movements, and is capable of cooperative work with other such robots, it is employed for various purposes, including an industrial robot.

The movement of such an arm-type robot is usually controlled through the use of a PTP (Point-to-Point) system which controls the posture of the arm at successive but short intervals. In this case, however, if the intervals between individual control operations are long, the locus of the tip of the arm is disturbed by such nonlinear factors as centrifugal force, mutual interference and so forth during high-speed operations; therefore, this control system is not suitable for use in the case where an accurate locus is needed.

For a smooth and high-speed operation, the so-called open-loop control is better which solves an equation of motion of the arm taking into account the influences of the nonlinear factors and performs control.

With the open-loop control, however, accurate positioning is impossible due to the influence of variations in friction and so forth and, accordingly, it is necessary to employ means for solving such a problem.

SUMMARY OF THE INVENTION

It is therefore an object of the present invention to provide an arm locus control method which combines the open-loop control and the feedback control to prevent the locus of the tip of the arm from being disturbed.

Other objects, features and advantages of the present invention will become more apparent by referring to the following description and the accompanying drawings.

BRIEF DESCRIPTION OF THE DRAWINGS

FIGS. 8(a) to (f) are graphs showing examples of linear control of the tip of the two-joint arm by the combined use of the feedback control and the bang-bang control;

DESCRIPTION OF THE PREFERRED EMBODIMENTS

Figure 1:
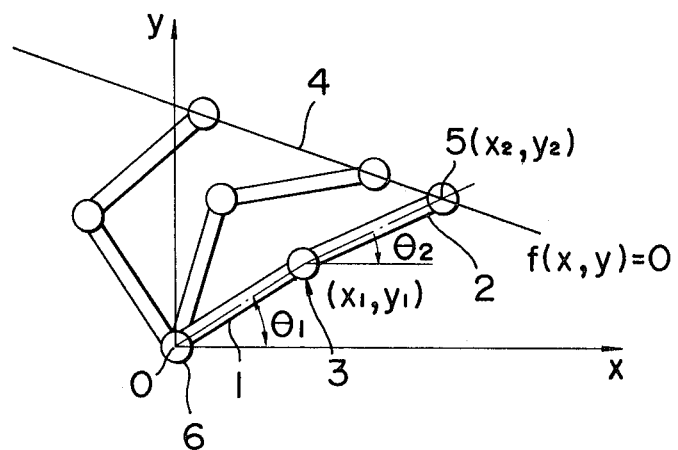
FIG. 1 is explanatory of the movement of a two-joint arm.

FIG. 1 is explanatory of the movement of a two-joint arm 3 composed of first and second arms 1 and 2. Reference numeral 4 indicates the locus along which the tip 5 of the second arm 2 is to move. Now, let the center of a rotary shaft 6 of the first arm 1 be at the origin of orthogonal coordinate axes x and y, and let the equation of the locus be f(x,y)=0. Then the coordinates $(x_2, y_2)$ of the tip 5 of the second arm 2 are given by the following expressions:

$$x_2 = l_1 \cos \theta_1 + l_2 \cos \theta_2$$

$$y_2 = l_1 \sin \theta_1 + l_2 \sin \theta_2$$

where $l_1$ is the length of the first arm 1, $l_2$ is the length of the second arm 2, $\theta_1$ is the angle between the first arm 1 and the x-axis and $\theta_2$ is the angle between the second arm 2 and the x-axis.

If the tip 5 $(x_2,y_2)$ of the second arm 2 lies on the locus 4, it follows naturally that $f(x_2,y_2)=0$. If the tip 5 of the second arm 2 deviates from the locus 4 to the positive side of the y-axis, $f(x_2,y_2)>0$ and, conversely, if it shifts to the negative side of the y-axis, $f(x_2,y_2)<0$. By feeding back, as a driving force for the second arm 2, the value of $f(x_2,y_2)$ resulting from the deviation, the tip 5 of the second arm 2 can be retained on the locus 4 at all times.

Figure 2:
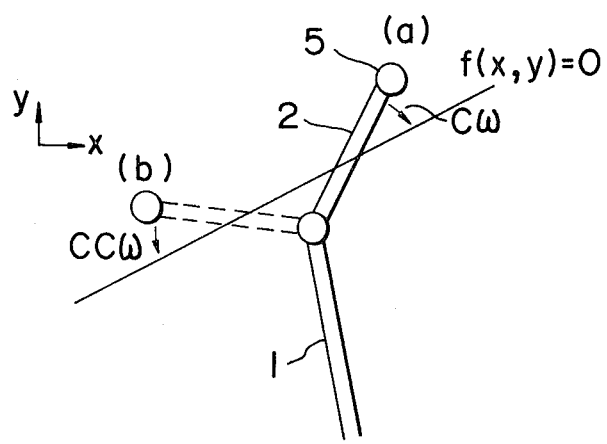
FIG. 2 shows two states in which the tip of a second arm is out of its locus.

When the tip 5 $(x_2,y_2)$ of the second arm 2 is in the state of $f(x_2,y_2)>0$, that is, when it lies on the positive side of the y-axis relative to the locus 4, it can assume two "postures" such as indicated by (a) and (b) in FIG. 2. Needless to say, the tip 5 of the second arm 2 can be brought back to the desired locus 4 in a short time by turning the second arm 2 clockwise and counterclockwise in the cases of the postures (a) and (b), respectively. However, by merely feeding back the value of $f(x_2,y_2)$ directly as a manipulated variable as described above, the second arm 2 turns only in a certain direction, so that locus control in the cases of the postures (a) and (b) cannot be performed.

Figure 3:
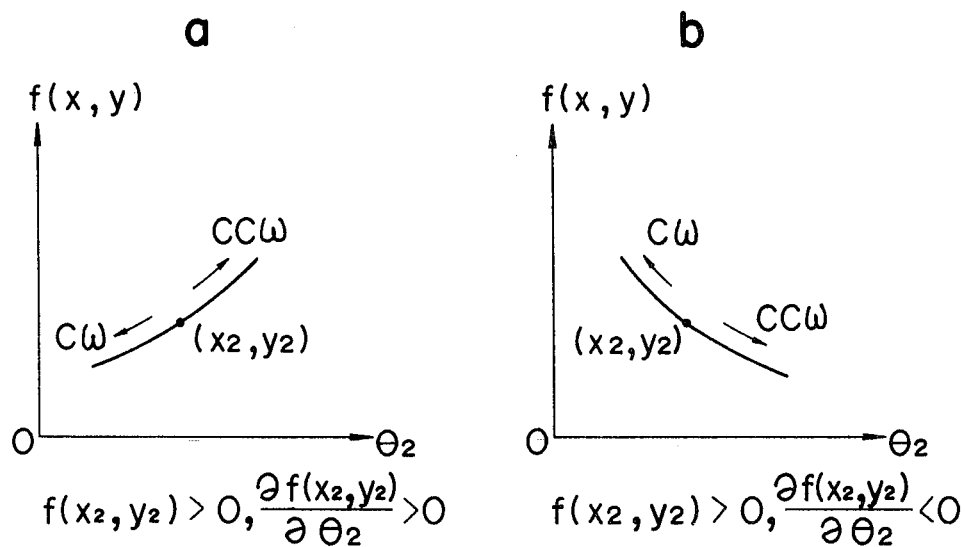
FIGS. 3(a) and 3(b) show how to determine the direction of turning the second arm when controlling the locus of the tip of the second arm.

In other words, it is necessary to make a distinction between the two postures in the case of $f(x_2,y_2)>0$ and to select the direction of turning the second arm 2 in accordance with each posture. To this end, $(\partial f(x,y)/\partial \theta_2)$ is checked. That is, it is sufficient to feed back such a value that the second arm 2 is turned counterclockwise to decrease the angle $\theta_2$ or clockwise to increase the angle $\theta_2$ depending upon whether $(\partial f(x,y)/\partial \theta_2) > 0$ as shown in FIG. 3(a) or $\partial f(x,y)/\partial \theta_2 < 0$ as shown in FIG. 3(b). The feedback rule becomes such as follows:

$$u = -f(x,y) \cdot (\partial f(x,y)/\partial \theta_2)$$

The present invention is intended to perform locus control on the abovesaid principle; in practice, however, a manipulated variable is fed back via a linear compensator for improvement of response characteristics and gain adjustment.

Next, a description will be given of a specific embodiment of the present invention based on the principle described above.

Figure 4:
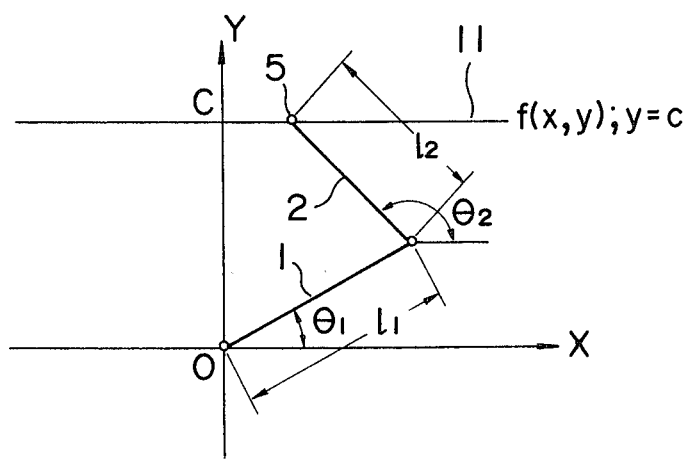
FIG. 4 shows the loci along which a two-joint arm and the tip of its second arm should follow.

Now, let it be assumed, for the sake of brevity, that a desired locus 11 is a straight line parallel to the x-axis as shown in FIG. 4, and that the lengths $l_1$ and $l_2$ of the first and second arms 1 and 2 of the two-joint arm 3 are 81 and 74.3 mm, respectively.

The equation of the straight line representing the locus 11 is as follows:

$$f(x,y) = y - c = 0$$

where c is a y-segment.

The coordinates $(x_2, y_2)$ of the tip of the second arm 2 are as follows:

$$x_2 = 81.0 \cos \theta_1 + 74.3 \cos \theta_2$$

$$y_2 = 81.0 \sin \theta_1 + 74.3 \sin \theta_2$$

Accordingly, $$f(x_2, y_2) = 81.0 \sin \theta_1 + 74.3 \sin \theta_2 - c$$

$$(\partial f(x_2, y_2)/\partial \theta_2) = 74.3 \cos \theta_2$$

Therefore, the feedback rule is given by $$u(\theta_1 \cdot \theta_2) = -f(x_2, y_2) \cdot \frac{\partial f(x_2, y_2)}{\partial \theta_2}$$

$$= -(81.0 \sin \theta_1 + 74.3 \sin \theta_2 - c) \times 74.3 \cos \theta_2$$

Figure 9:
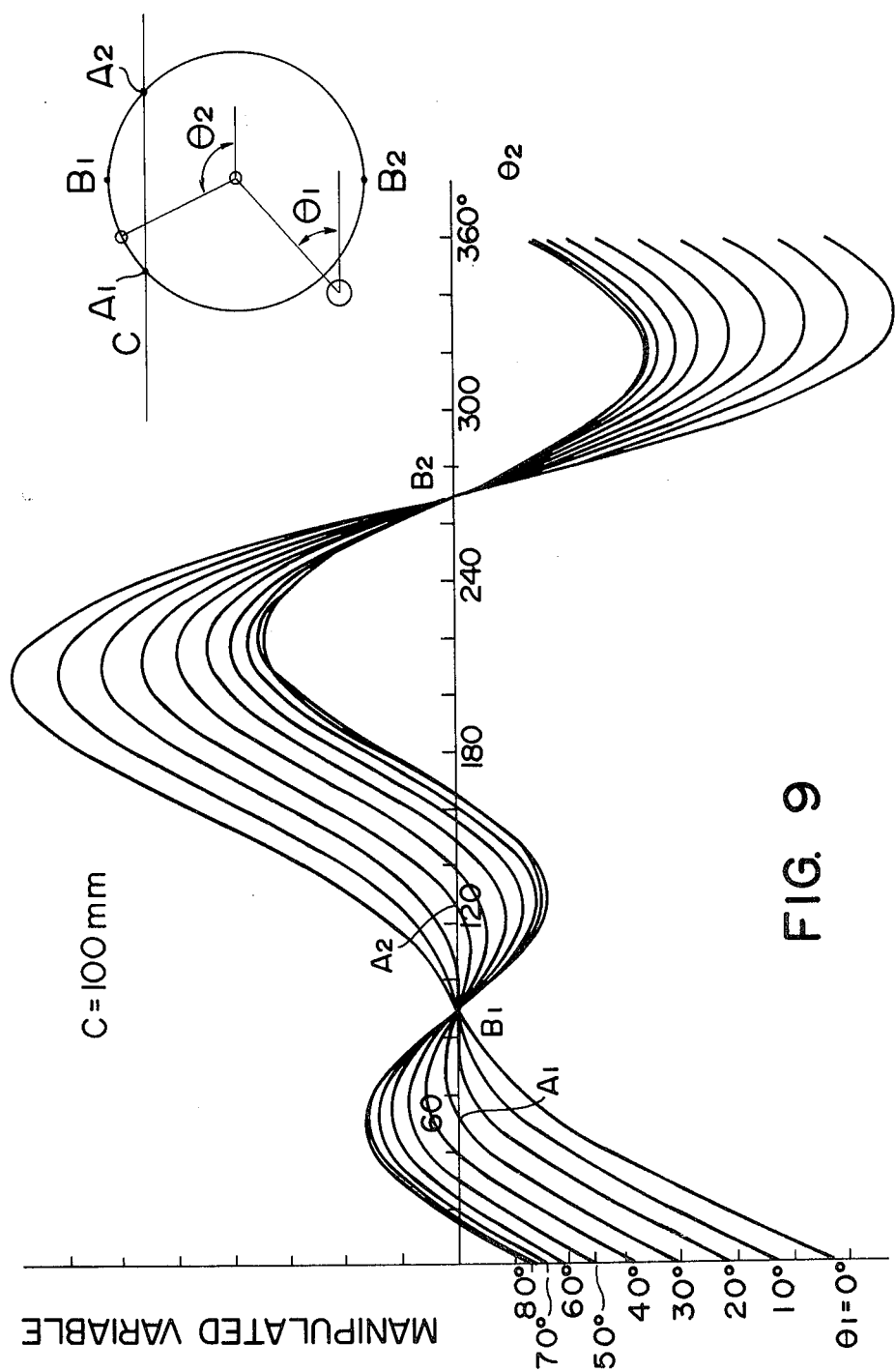
FIG. 9 shows values of manipulated variable u relative to each of $\theta_1$ and $\theta_2$ in the embodiment of FIG. 4 in the case of C=100.

FIG. 9 is a graphical representation of the magnitude of the manipulated variable u in the case of c = 100 mm with respect to each value of the angles $\theta_1$ and $\theta_2$ in the above expression. If the case of $\theta_1$ being 30°, A1 and A2 are stable equilibrium points on the locus and even if the tip 5 of the second arm 2 deviates from the locus upwardly or downwardly thereof, it is returned to the locus. B1 and B2 are unstable equilibrium points and if the tip 5 of the second arm 2 deviates from the locus in either direction, the second arm 2 is returned to the locus turning toward the point (A1 or A2) which is nearer its position of deviation.

But, when the tip 5 of the second arm 2 does not reach the locus, that is, when $\theta_1 = 0° \sim 18.5°$, 161.5° ~ 180°, the points A1 and A2 do not exist and the point B1 is a stable equilibrium point.

By such feedback control, the tip 5 of the second arm 2 can be brought to a desired locus (within a range in which it can be reached, of course) regardless of the angle of the first arm 1.

In practice, however, it is important to position the tip 5 of the second arm 2 on the locus accurately to a target value in a short time. To perform this, it is necessary to select the magnitude of a force to be applied to the joint of the first arm and the time in which to apply the force. This will hereinbelow be described.

Figure 5:
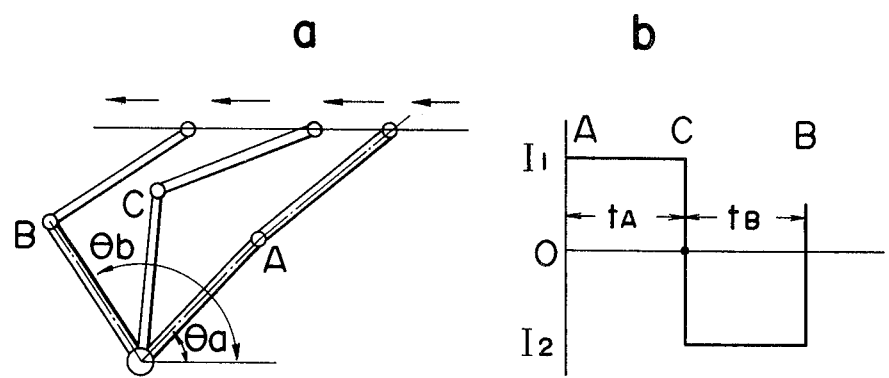
FIG. 5(a) shows the movement of the two-joint arm.
FIG. 5(b) shows a bang-bang current waveform for driving the first arm of the two-joint arm.
Figure 6:
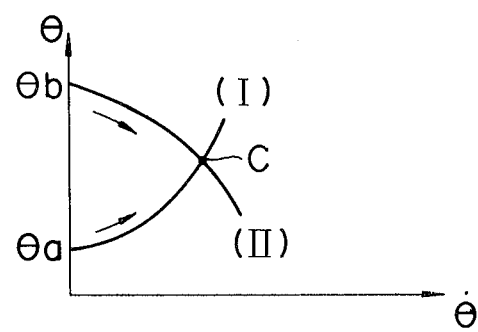
FIG. 6 shows how to set a switching point of the waveform depicted in FIG. 5(b)

In general, it is a bang-bang force pattern that is commonly used for minimum time control, and optimum control can be achieved by a suitable selection of a switching point of the pattern. In the two-joint arm, as it is not always optimum to switch the pattern at a moment ½ of the final arrival time under the influence of friction and mutual interference of the first and second arms, the switching point is set by the following method of analysis in a phase plane. For the numerical solution of a differential equation, use is usually made of Runge-Kutta-Gill's method (hereinafter referred to simply as the RKG method) which inputs initial conditions such as an initial value, an initial velocity, etc. and the time step of calculation. With this method, the equation can be solved from such final conditions as a final position and the like in a reverse direction in time (at the negative time pitch). Describing in the phase plane trajectories of numerical solutions of the first arm obtained from the initial and final positions by taking advantage of the above, the switching point and the time of arrival can be determined based on the intersection of the trajectories. Now, let it be assumed, for example, that the first arm 1 is turned from a point A to B via C as shown in FIG. 5(a), and that a driving force for the first arm 1 is applied in a bang-bang form as depicted in FIG. 5(b). And assume that the bang-bang waveform is switched at the point C. In this case, the first arm 1 is turned and accelerated towards the point B in accordance with an equation of motion at the positive time pitch, based on the assumption that a maximum counterclockwise torque is applied to the first arm 1 at a standstill at the point A. The resulting locus of the first arm 1 in the phase plane is shown by a curve (I) in FIG. 6. Next, an equation of motion is solved at the negative time pitch based on the assumption that a maximum clockwise torque is applied to the first arm 1, considering the point B as its initial position (which point is the final position in practice) and the velocity at this position to be zero. The resulting locus in the phase plane is shown by a curve (II) in FIG. 6. Letting the intersection of the two trajectories I and II be represent by C, the angle $\theta$ and the angular velocity $\dot{\theta}$ of the first arm 1 naturally coincide with each other at the point C. By using the point C as the switching point of the bang-bang control, that is, by driving the first arm 1 with such a bang-bang waveform that the time for accelerating the first arm 1 from the point A to C and the time for decelerating it from the point C to B become tA and tB, respectively, the first arm 1 can be accelerated and then decelerated without incurring any discontinuities in its angle and velocity at the point C. In addition, if the simulation is accurate, the first arm 1 starting from the point A can be positioned in the vicinity of the point B in a minimum period of time. In practice, however, the position of the first arm 1 is shifted by external disturbances such as a change in friction and so forth, so that it is necessary to switch the bang-bang control to ordinary position control at the point B. In this method of obtaining the switching point from the phase plane, it is requisite that the state or posture of the second arm is not discontinuous but, in this case, as the second arm is controlled to move on the same straight line, it always assumes the same posture in the neighborhood of the switching point; hence, there is no problem in this regard.

Figure 7:
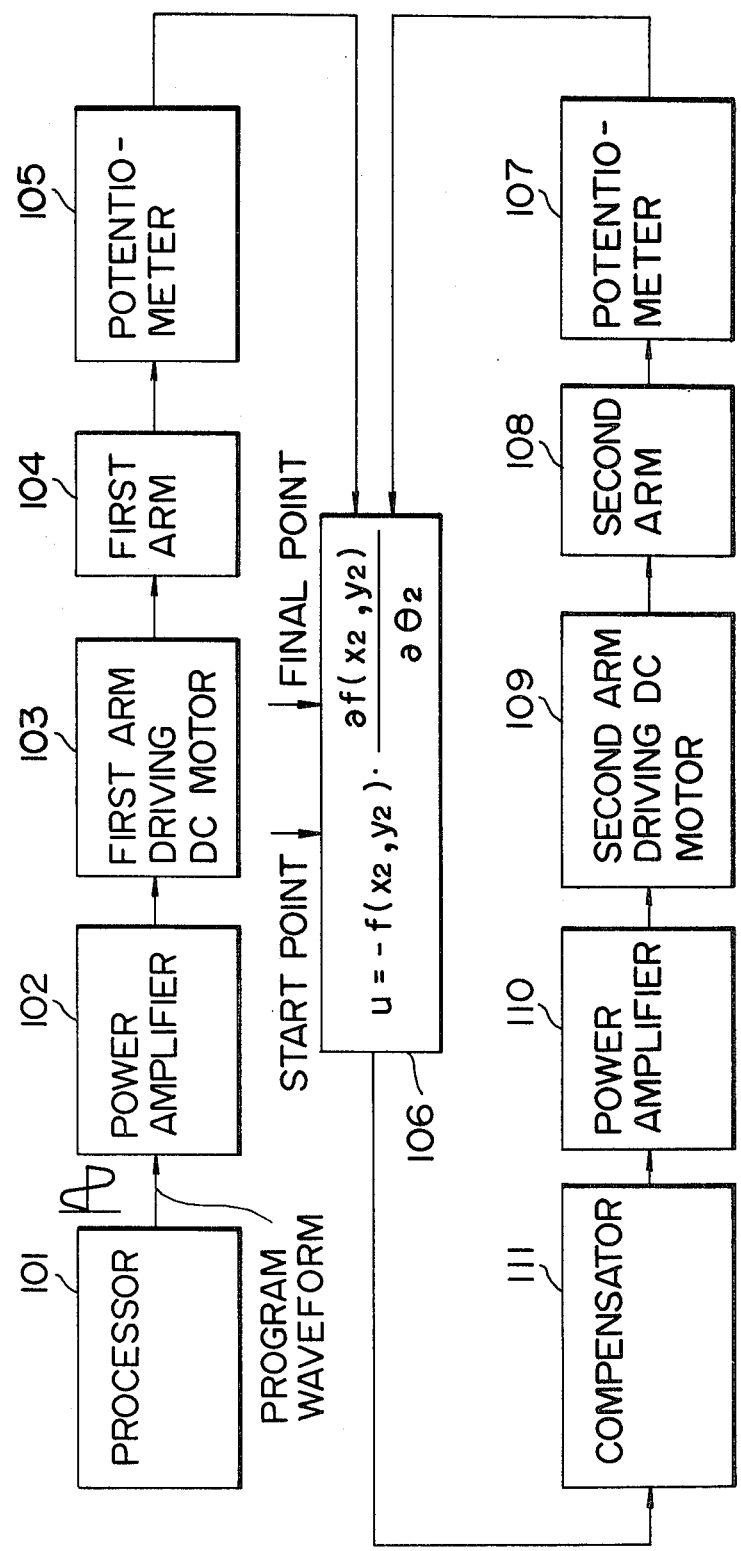
FIG. 7 is a block diagram illustrating an arm locus control system for use in the present invention.

A torque pattern for driving the first arm, obtained by the above method, is prestored in a memory of a computer and read out therefrom as required. FIG. 7 illustrates in block form the arrangement of the entire system. As shown in FIG. 7, a first arm 104 (corresponding to the arm 1 in FIG. 1) is driven by such a signal as shown in FIG. 5(b) which is provided from a processor 101. In practice, however, the signal is given such a waveform as depicted in FIG. 8(f) in consideration of its transient characteristics. The signal from the processor 101 is amplified by a power amplifier 102 and applied to a first arm driving DC motor 103, driving the first arm 104 on an open-loop control basis.

On the other hand, a second arm 108 (corresponding to the arm 2 in FIG. 1) is driven along a predetermined locus while calculating the coordinates of its tip. To this end, the outputs from potentiometers 105 and 107 for detecting the angles of the first and second arms 104 and 108, respectively, are provided to an arithmetic operation circuit 106, wherein the amount of movement of the second arm 108 is calculated. The output from the arithmetic operation circuit 106 is applied via a compensator (PID control circuit) 111 to a power amplifier 110 to produce such a drive signal as shown in FIG. 8 (f), which is fed to a second arm driving DC motor 109 to drive the second arm 108.

Figure 7A:
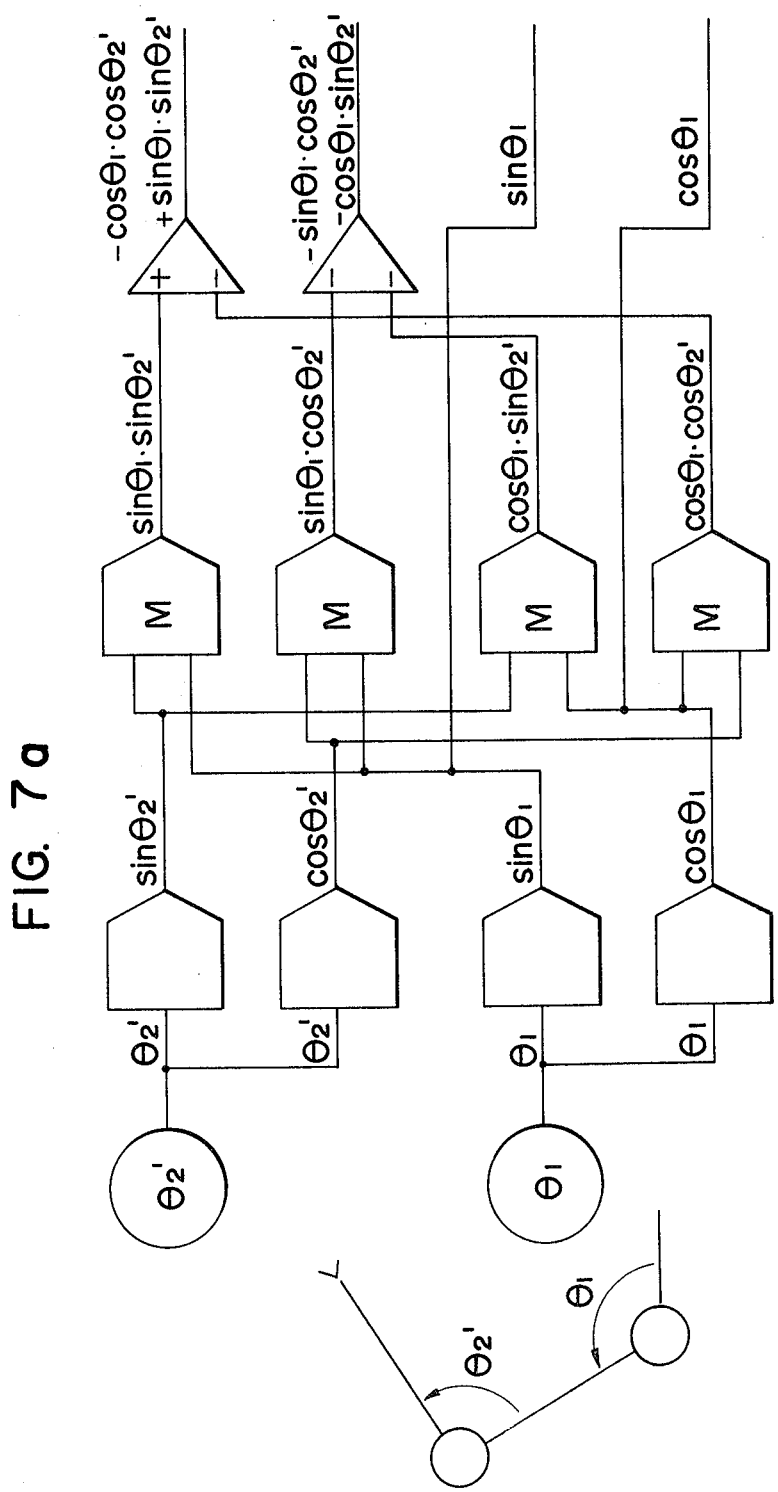
FIGS. 7(a), (b) and (c) illustrate various specific examples of an arithmetic operation circuit used in the system of FIG. 7.
Figure 7B:
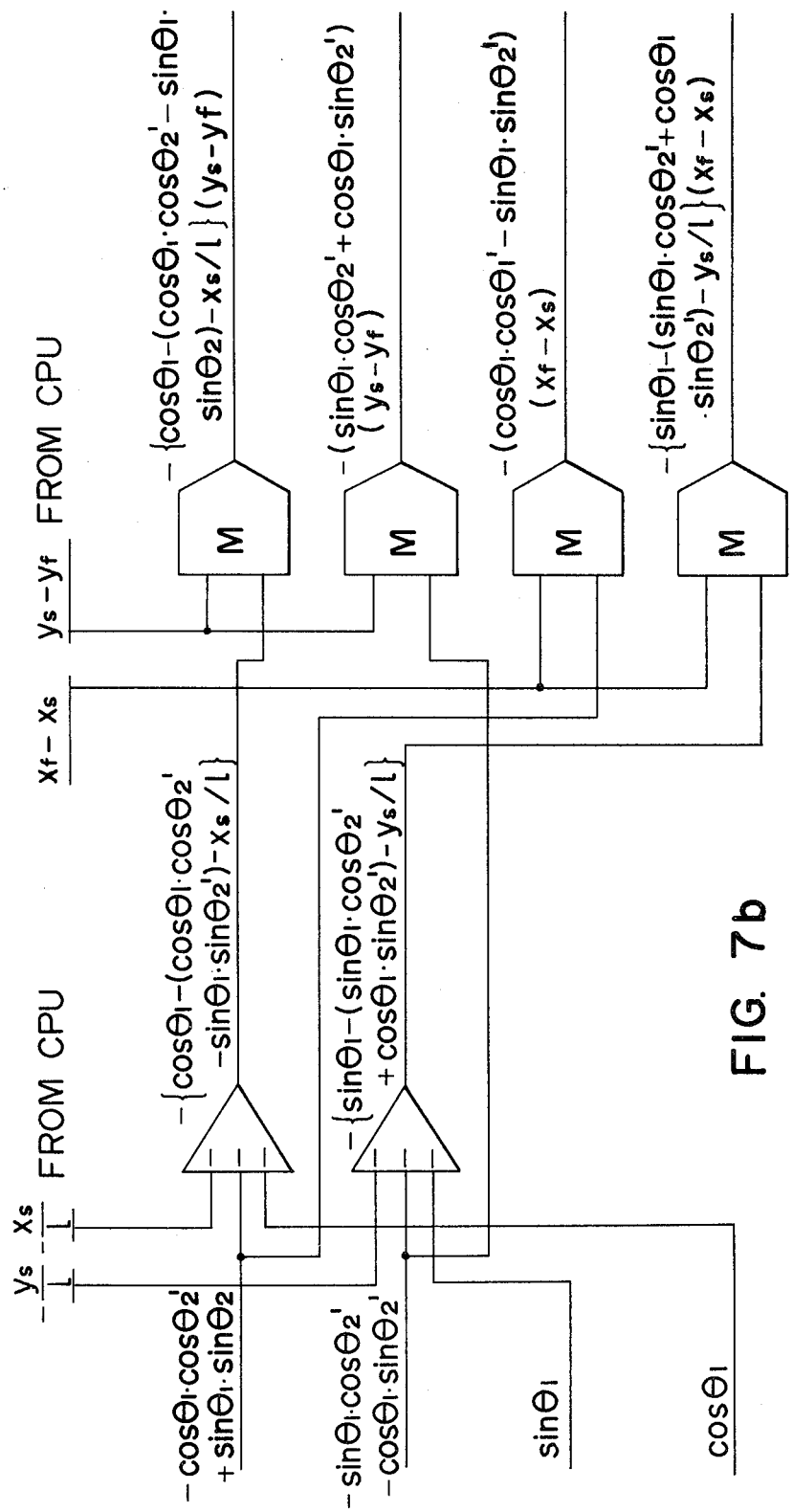
Figure 7C:
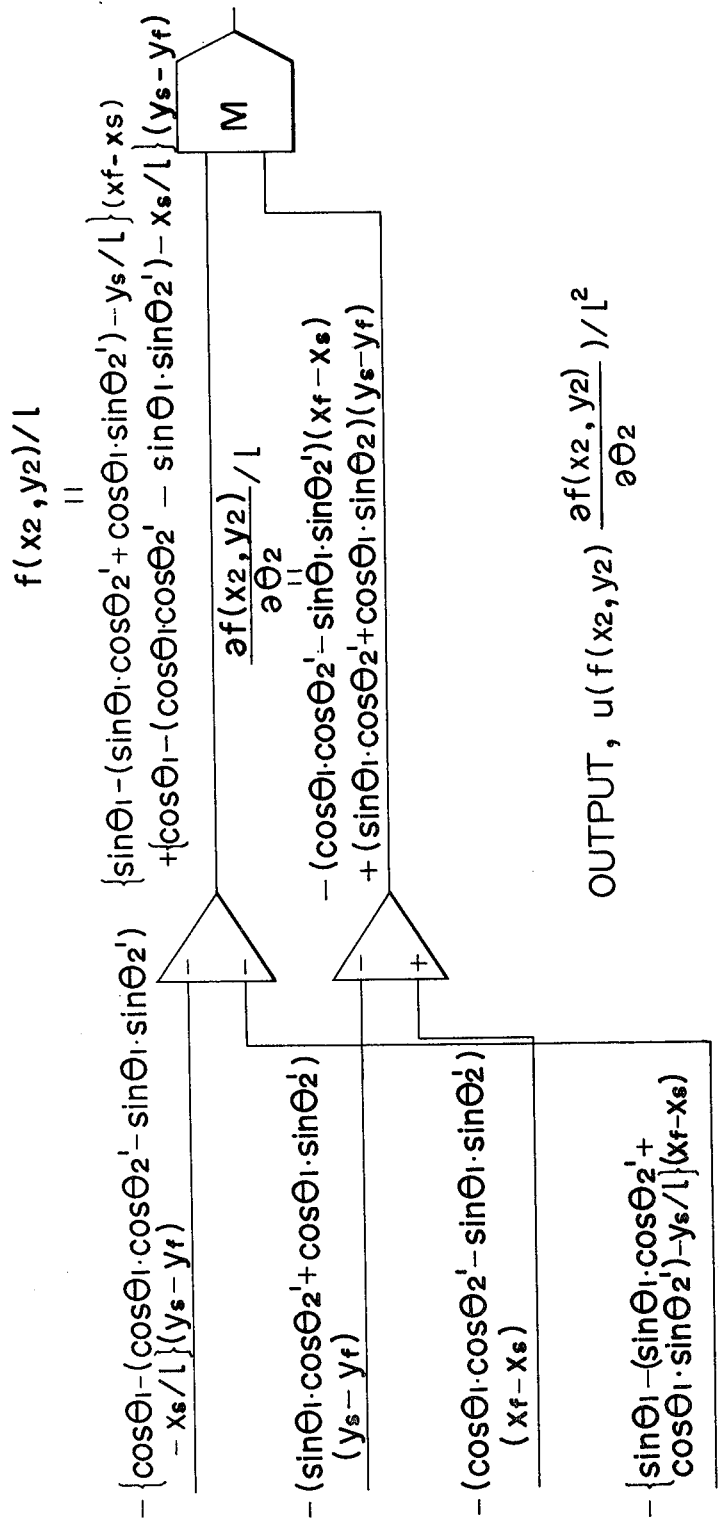

A specific example of the arithmetic operation circuit 106 is illustrated in FIGS. 7(a) to 7(c).

Now, let it be assumed that the locus of the second arm 108 is straight. Accordingly, the locus is a straight line joining a starting point s and a final point f provided from the processor 101. The equation of this straight line is as follows:

$$f(x,y) = (y - y_s)(x_f - x_s) + (y_s + y_f)(x - x_s)$$

where $(x_s, y_s)$ and $(x_f, y_f)$ are the x,y coordinates of the starting point s and the final point f of the locus, respectively. Assuming that the first and second arms have the same length l, the coordinates $(x_2, y_2)$ of the tip of the second arm is as follows:

$$x_2 = l(\cos\theta_1 + \cos\theta_2)$$

$$y_2 = l(\cos\theta_1 + \sin\theta_2)$$

Accordingly, $$f(x_2,y_2) = l\{(\sin\theta_1 + \sin\theta_2) - y_s/l\}(x_f - x_s) + l\{(\cos\theta_1 + \cos\theta_2) - x_s/l\}(y_s - y_f)$$

$$\frac{\partial f(x_2,y_2)}{\partial \theta_2} = l\{\cos\theta_2(x_f - x_s) - \sin\theta_2(y_s - y_f)\}$$

The feedback rule is given by $$u = -f(x_2,y_2) \cdot \frac{\partial f(x_2,y_2)}{\partial \theta_2}$$

The above is the same as described previously. In this example, however, the angles that can be detected by the potentiometers are not $\theta_1, \theta_2$ but $\theta_1, \theta_2'$ as shown. Then, $\theta_2$ in the above expression is converted to $\theta_2'$ as follows:

$$\theta_1 = \theta_1$$

$$\theta_2 = \theta_2' + \theta_1 - \pi$$

Accordingly, from $$\sin\theta_2 = -(\sin\theta_1 \cdot \cos\theta_2' + \cos\theta_1 \cdot \sin\theta_2')$$

$$\cos\theta_2 = -(\cos\theta_1 \cdot \cos\theta_2' - \sin\theta_1 \cdot \sin\theta_2')$$

it follows that $$f(x_2,y_2) = l\{\sin\theta_1 - (\sin\theta_1 \cdot \cos\theta_2' + \cos\theta_1 \cdot \sin\theta_2') - y_s/l\} \times (x_f - x_s) + l\{\cos\theta_1 - (\cos\theta_1 \cdot \cos\theta_2' - \sin\theta_1 \cdot \sin\theta_2') - x_s/l\} \times (y_s - y_f)$$

$$\frac{\partial f(x_2,y_2)}{\partial \theta} = l\{-(\cos\theta_1 \cdot \cos\theta_2' - \sin\theta_1 \cdot \sin\theta_2')(x_f - x_s) + (\sin\theta_1 \cdot \cos\theta_2' + \cos\theta_1 \cdot \sin\theta_2')(y_s - y_f)\}$$

Therefore, the feedback rule becomes as follows:

$$u = -f(x_2,y_2) \cdot \frac{\partial f(x_2,y_2)}{\partial \theta_2}$$

The locus control can be achieved by such feedback control of the second arm using the arithmetic operation circuit shown in FIGS. 7(a) to 7(c). The deviation of the tip of the second arm is calculated by the potentiometer provided at each joint but this system can also be achieved by the use of a position recognition device which yields a signal the sign of which is inverted on both sides of the locus, such as a TV camera or the like. Furthermore, the first arm 1 is placed under the open-loop control but, in this case, positioning becomes inaccurate under the influence of friction and the like and, accordingly, it is also possible to employ variable-value control of precalculated angular variations, in which case the two-step control is not needed. FIGS. 8(a) to 8(f) illustrate an example of controlling the tip of a two-joint arm along a straight line locus by the combined use of the abovesaid feedback control system and the bang-bang control system. Let it be assumed that the lengths $l_1$ and $l_2$ of the first and second arms 1 and 2 are 81 and 74.3 mm respectively.

Figure 8A:
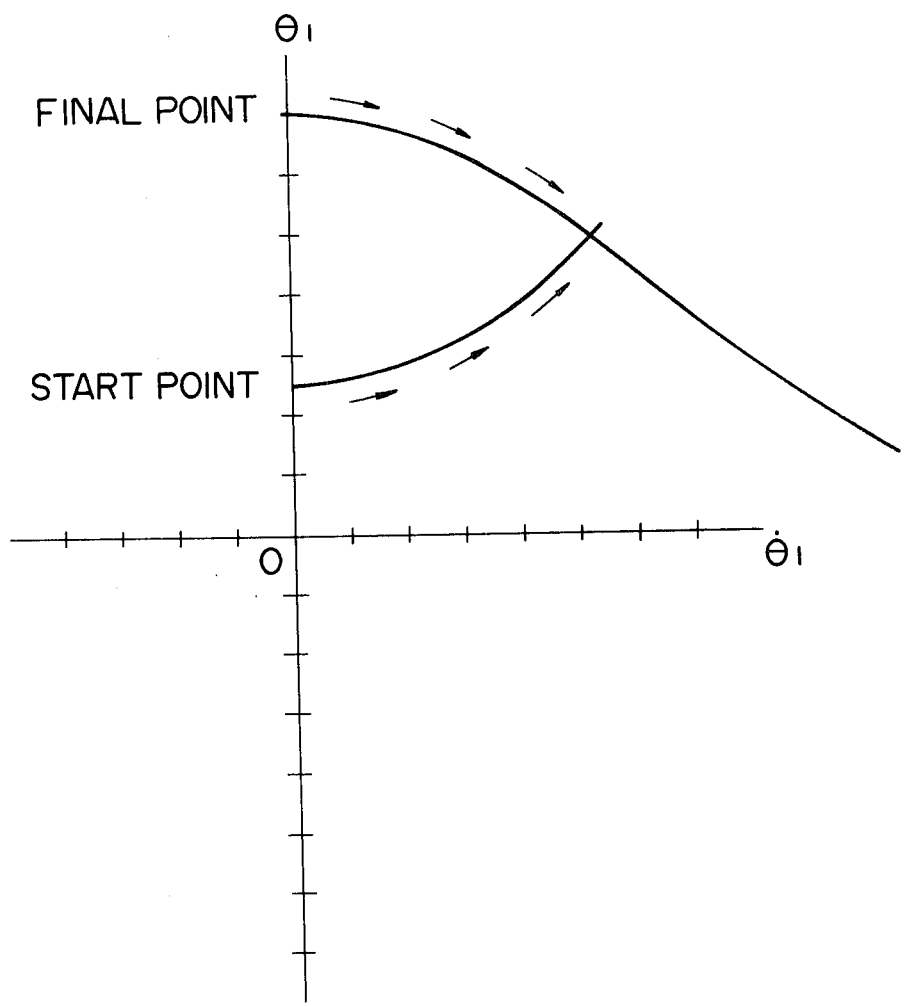

FIG. 8(a) is a graph for searching for the switching point of the current for the first arm driving DC motor in the phase plane so that the tip of the second arm 2 may be moved from a starting point (100 mm, 80 mm) to a final point (−20 mm, 20 mm) in a straight line. The drive current has a bang-bang waveform of ±1A but is sinusoidal in its rise and fall in view of vibration of the system.

Figure 8B:
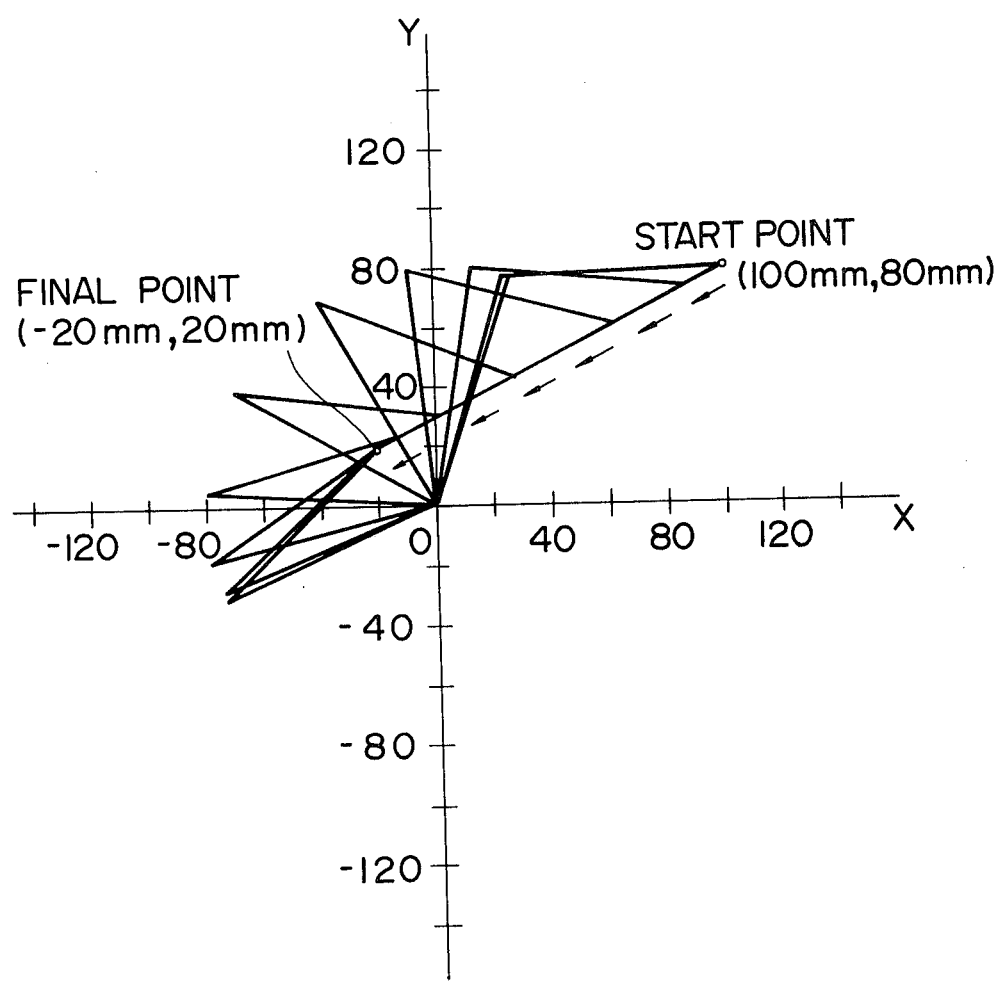

FIG. 8(b) is a graph showing the locus of the second arm tip and the posture of each arm every 30 ms.

Figure 8C:
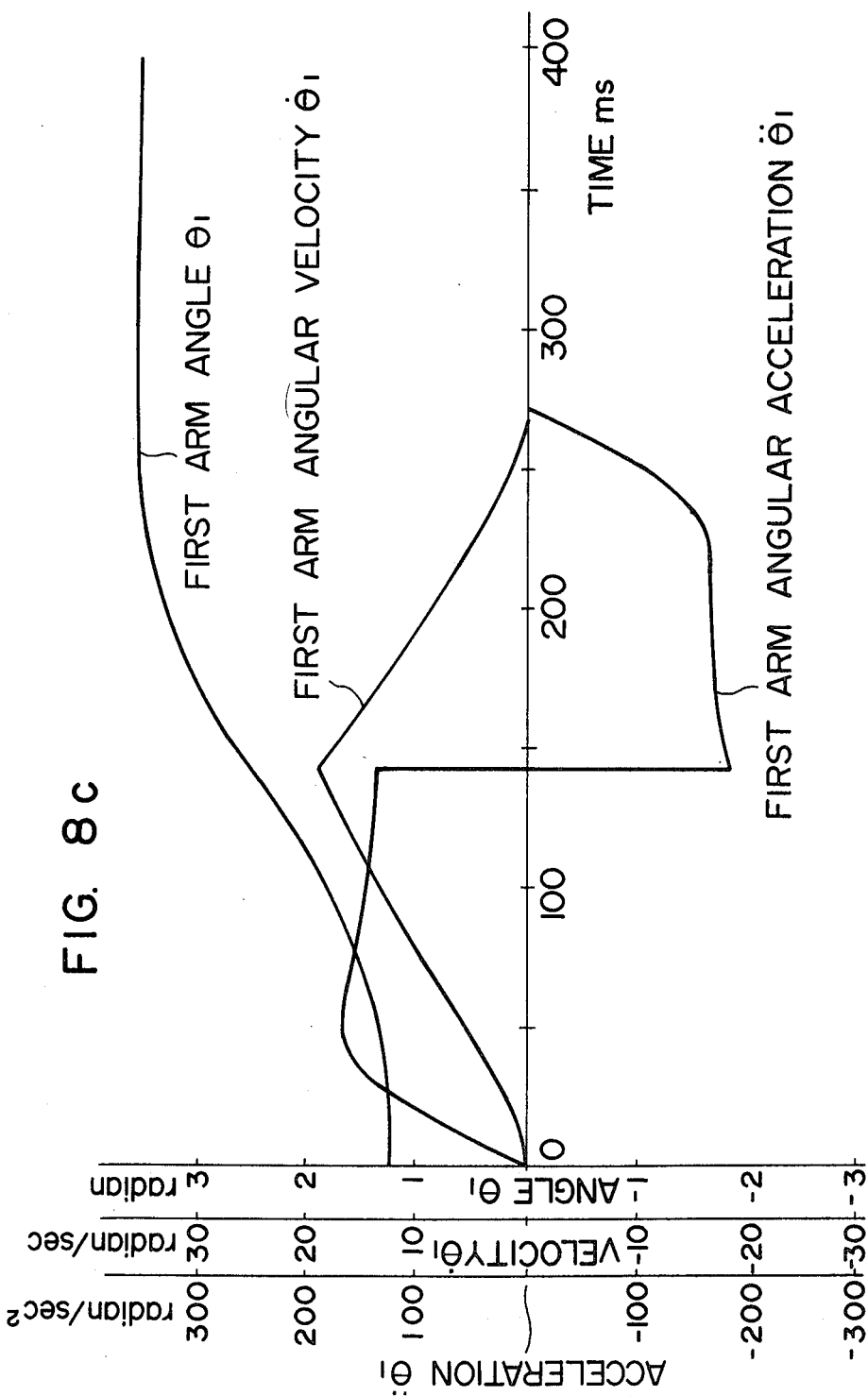

FIG. 8(c) is a graph showing variations in the angle, the angular velocity and the angular acceleration of the first arm 1.

FIG. 8(d) is a graph showing variations in the angle, the angular velocity and the angular acceleration of the second arm 2.

Figure 8E:
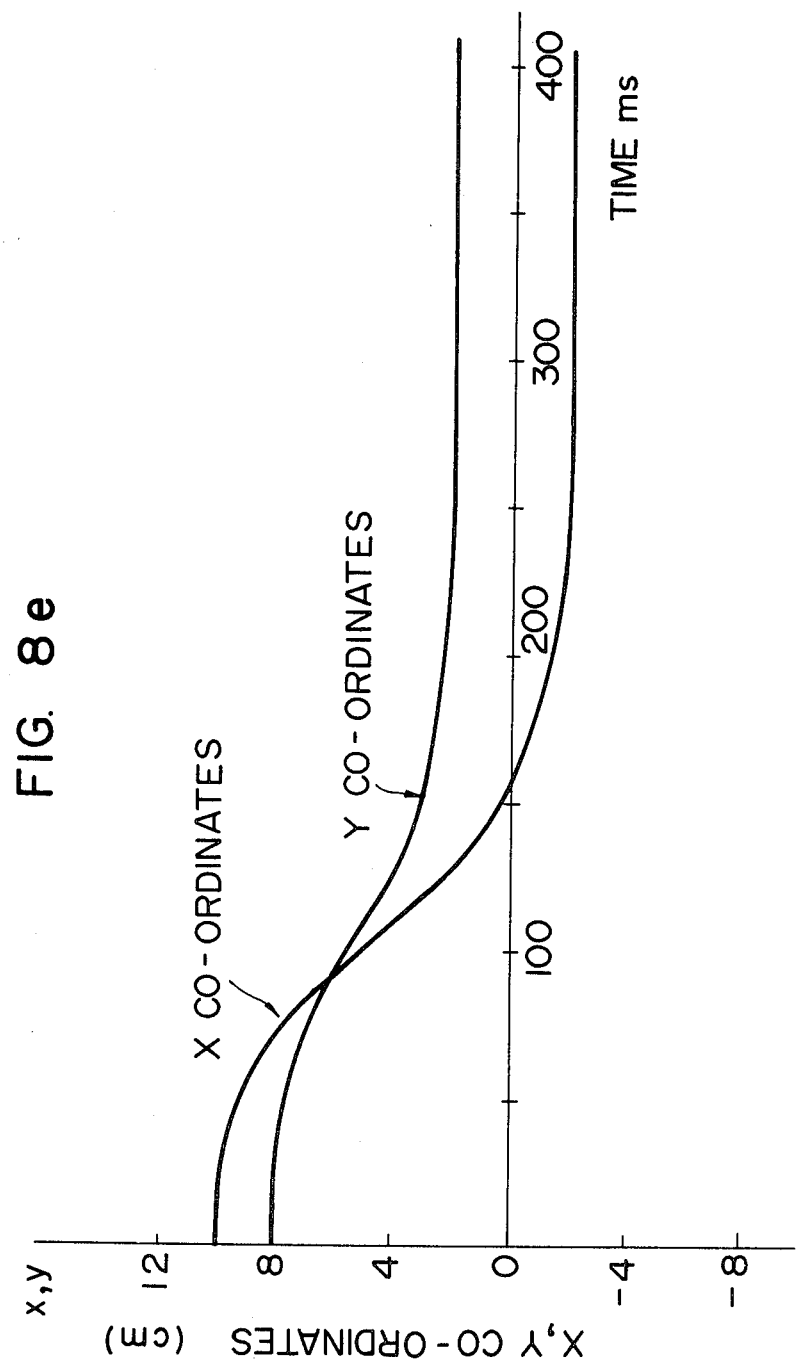
Figure 8F:
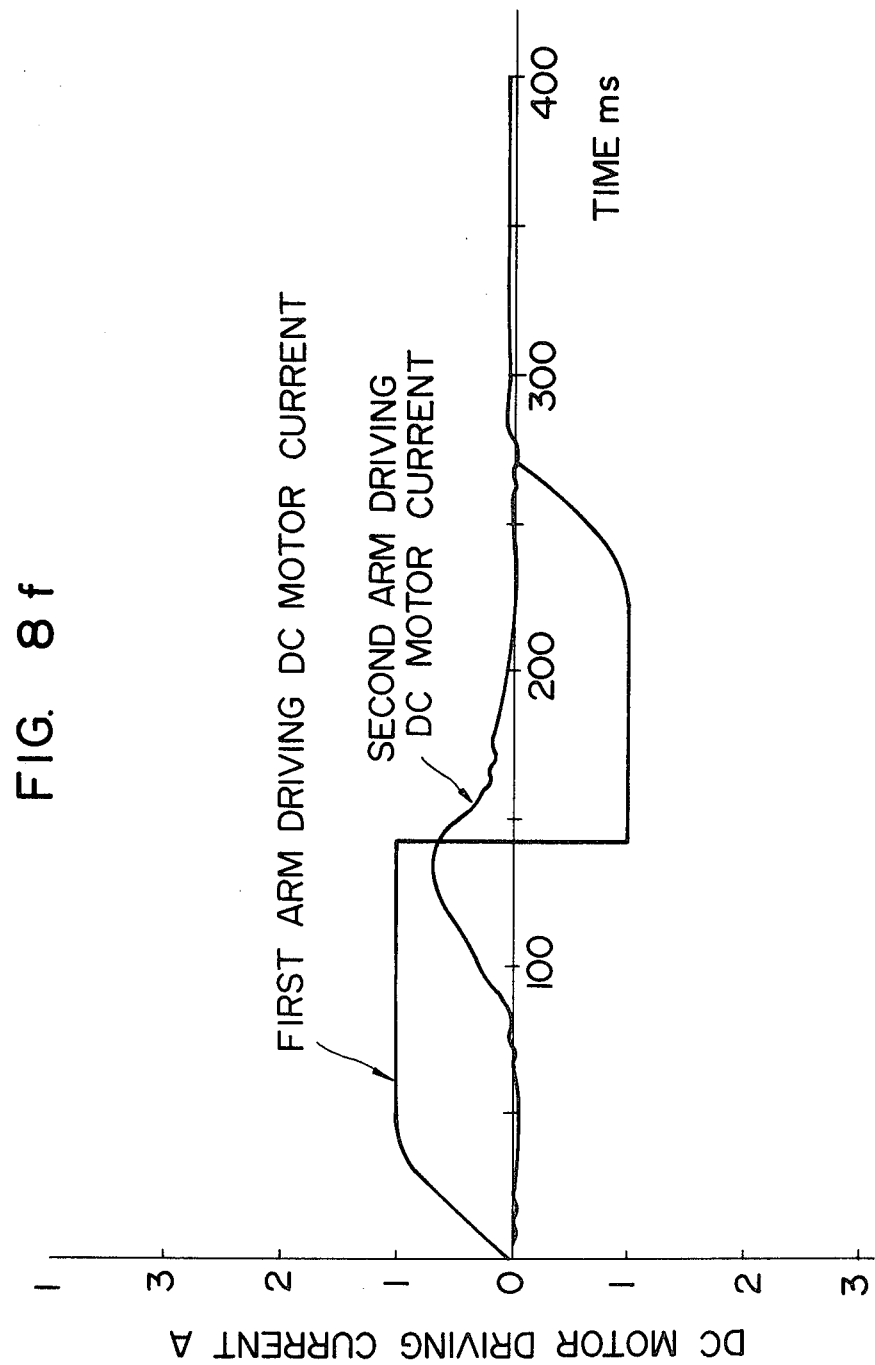

FIG. 8(e) is a graph showing variations in the X, Y coordinates of the tip of the second arm 2.

FIG. 8(f) is a graph of current variations of the first and second arm driving DC motors.

Next, a description will be given of an example of a method for positioning the arm after the abovesaid locus control of the arm according to the present invention.

Figure 10:
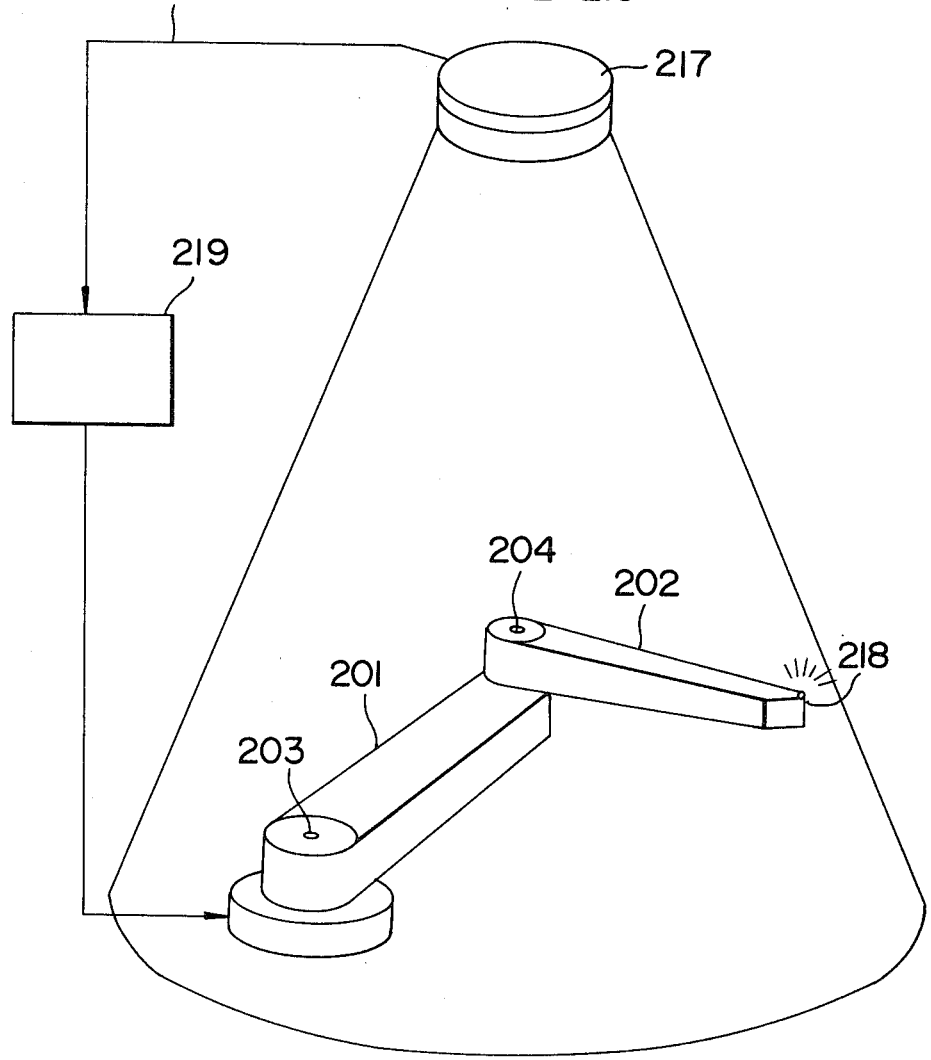
FIG. 10 shows how to recognize and decide the position of the tip of the two-joint arm.
Figure 11:
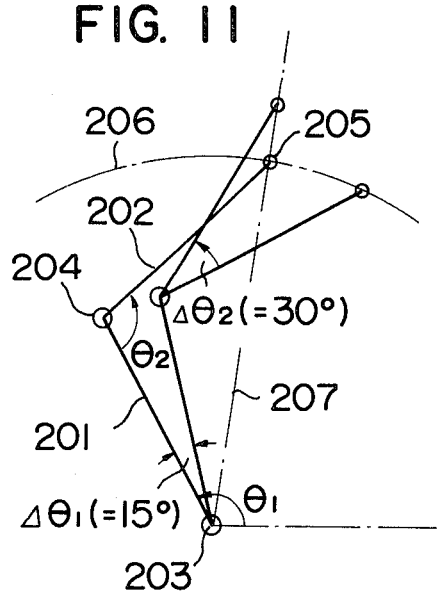
FIG. 11 shows the movement of an equal-length two-joint arm.

FIG. 10 is a perspective view of an equal-length two-joint arm and FIG. 11 is explanatory of its movement. In FIGS. 10 and 11, reference numerals 201 and 202 indicate arms; 203 and 204 designate joints; $\Lambda_1$ identifies an angle between a reference line and the arm 201 at the joint 203; and $\theta_2$ designates an angle between the arms 201 and 202 at the joint 204.

In FIG. 11, if the two-joint arm is moved varying only the angle $\theta_1$ while fixing the angle $\theta_2$, the tip 205 of the two-joint arm moves on the same circumference 206 about the joint 203. In the case of moving the two-joint arm while varying both of the angles $\theta_1$ and $\theta_2$, letting the variations in the angles $\theta_1$ and $\theta_2$ be represented by $\Delta\theta_1$ and $\Delta\theta_2$, respectively, and letting $\Delta\theta_2$ be equal to $-2\Delta\theta_1$ in view of the nature of an isosceles triangle, the tip 205 moves on a straight line 207 which joins the joint 203 and the previous position of the tip 205. In concrete terms, for example, when the angle $\theta_1$ is decreased by 15°, the tip 205 can be moved on the straight line 207 by increasing the angle $\theta_2$ by 30°. Therefore, this arm can be moved just like the polar coordinates by simple angle variations. But this movement is possible within the range of $0 < \theta_2 < \pi$ or $\pi < \theta_2 < 2\pi$.

Figure 12:
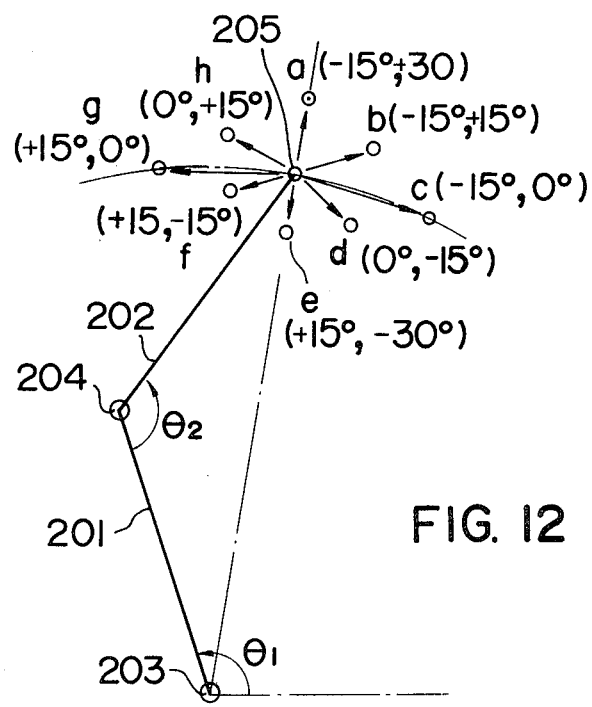
FIG. 12 shows the direction of its movement.

By a combination of such simple angle variations through utilization of the abovesaid nature, it is possible to move the tip 205 of the two-joint arm in four directions substantially perpendicularly intersecting one another and four directions which are each intermediate between adjacent ones of them. FIG. 12 illustrates the movement of the tip 205 in the eight directions in the case of angle variations of 15° and 30° being combined.

In FIG. 12, letting the angle variation be represented by $\Delta\theta$, the movement in the eight directions is generally expressed in the following, in which an arrow indicates the formation of the next angle from the previous angle.

Figure 13:
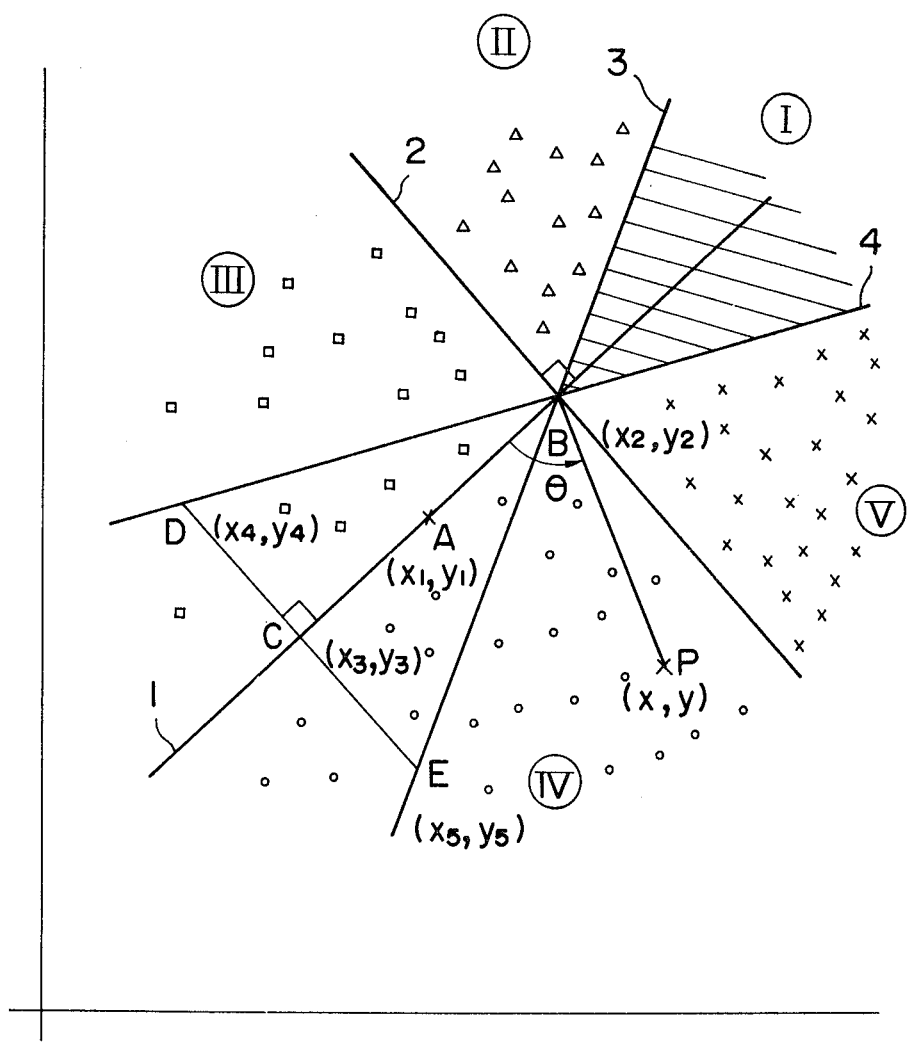
FIGS. 13 and 14 show how to decide the direction of movement of the tip of the arm.

Direction $a$ $\begin{cases} \theta_1 \leftarrow \theta_1 - \Delta\theta \\ \theta_2 \leftarrow \theta_1 + 2\Delta\theta \end{cases}$ Direction $b$ $\begin{cases} \theta_1 \leftarrow \theta_1 - \Delta\theta \\ \theta_2 \leftarrow \theta_1 + \Delta\theta \end{cases}$ Direction $c$ $\begin{cases} \theta_1 \leftarrow \theta_1 - \Delta\theta \\ \theta_2 \leftarrow \theta_2 \end{cases}$ Direction $d$ $\begin{cases} \theta_1 \leftarrow \theta_1 \\ \theta_2 \leftarrow \theta_2 - \Delta\theta \end{cases}$ Direction $e$ $\begin{cases} \theta_1 \leftarrow \theta_1 + \Delta\theta \\ \theta_2 \leftarrow \theta_2 - 2\Delta\theta \end{cases}$ Direction $f$ $\begin{cases} \theta_1 \leftarrow \theta_1 + \Delta\theta \\ \theta_2 \leftarrow \theta_2 - \Delta\theta \end{cases}$ Direction $g$ $\begin{cases} \theta_1 \leftarrow \theta_1 + \Delta\theta \\ \theta_2 \leftarrow \theta_2 \end{cases}$ Direction $h$ $\begin{cases} \theta_1 \leftarrow \theta_1 \\ \theta_2 \leftarrow \theta_2 + \Delta\theta \end{cases}$ Next, a description will be given, with reference to FIG. 13, of the decision of the direction of movement of the arm tip in a plane. In FIG. 13, 1, 2, 3 and 4 are straight lines extending in the abovesaid eight lines.

From the coordinates $(x_1, y_1)$ and $(x_2, y_2)$ of points A and B, the equation of the straight line 1 is obtained as follows:

$$y - y_1 = \frac{y_2 - y_1}{x_2 - x_1}(x - x_1) \quad (1)$$

From the above it follows:

$$f(x,y) = (y-y_1)(x_2-x_1) - (y_2-y_1)(x-x_1) \quad (2)$$

If the straight line 2 is determined to intersect the straight line 1 at the point B, the equation of the straight line 2 is as follows:

$$y - y_2 = \frac{x_1 - x_2}{y_2 - y_1}(x - x_2) \quad (3)$$

From this it follows:

$$g(x,y) = (y-y_2)(y_1-y_2) + (x-x_2)(x_1-x_2) \quad (4)$$

If $$\overline{AB} = \overline{CA}, \quad x_1 = \frac{x_3 + x_2}{2} \text{ and } y_1 = \frac{y_3 + y_2}{2},$$

so that the coordinates $(x_3, y_3)$ of the point C are as follows:

$$\left.\begin{array}{l} x_3 = 2x_1 - x_2 \\ y_3 = 2y_1 - y_2 \end{array}\right\}$$

Determining that $\overline{DC} = \overline{CE} = \overline{CA}$ and that DELCB, the coordinates $(x_4, y_4)$ and $(x_5, y_5)$ of the points D and E becomes as follows:

$$x_4 = x_3 - (y_2 - y_1) = 2x_1 - x_2 - y_2 + y_1$$

$$y_4 = y_3 + (x_2 - x_1) = 2y_1 - y_2 + x_2 - x_1$$

$$x_5 = x_3 + (y_2 - y_1) = 2x_1 - x_2 + y_2 - y_1$$

$$y_5 = y_3 - (x_2 - x_1) = 2y_1 - y_2 - x_2 + x_1$$

Therefore, since the straight line 4 passes through the points D and B, its equation is as follows:

$$h(x,y) = (y-y_2)(x_2-2x_1+x_2+y_2-y_1) - (x-x_2)(y_2-2y_1+y_2-x_2+x_1) \quad (6)$$

Further, since the straight line 3 passes through the points E and B, its equation is as follows:

$$y - y_2 = \frac{y_2 - (2y_1 - y_2 - x_2 + x_1)}{x_2 - (2x_1 - x_2 + y_2 - y_1)}(x - x_2) \quad (7)$$

From this, it follows that $$i(x,y) = (y-y_2)(x_2-2x_1+x_2-y_2+y_1) - (x-x_2)(y_2-2y_1+y_2+x_2-x_1) \quad (8)$$

Putting the coordinates of the point P in the equations (2), (4), (6) and (8) of the four straight lines to decide whether they are positive or negative, it can be known in which one of regions I, II, III, IV and V the point P lies.

Now, if $\angle ABP = \theta$, the region I: $\pi - \theta_1 < \theta < \pi + \theta_1$ ($\theta_1 = \tan^{-1}(0.5)$), is $h(x,y) > 0$, $i(x,y) < 0$;

the region II: $\pi = \theta_1 \leq \theta \leq \frac{2}{3}\pi$, is $f(x,y) > 0$, $g(x,y) \geq 0$, $i(x,y) \geq 0$;

the region III: $(3/2)\pi < \theta < 2\pi$, is $f(x,y) > 0$, $g(x,y) > 0$;

the region IV: $0 < \theta < (\pi/2)$, is $f(x,y) \leq 0$, $g(x,y) > 0$; and the region V: $\pi/2 \leq \theta \leq \pi - \theta_1$, is $f(x,y) \leq 0$, $g(x,y) \leq 0$.

Figure 14:
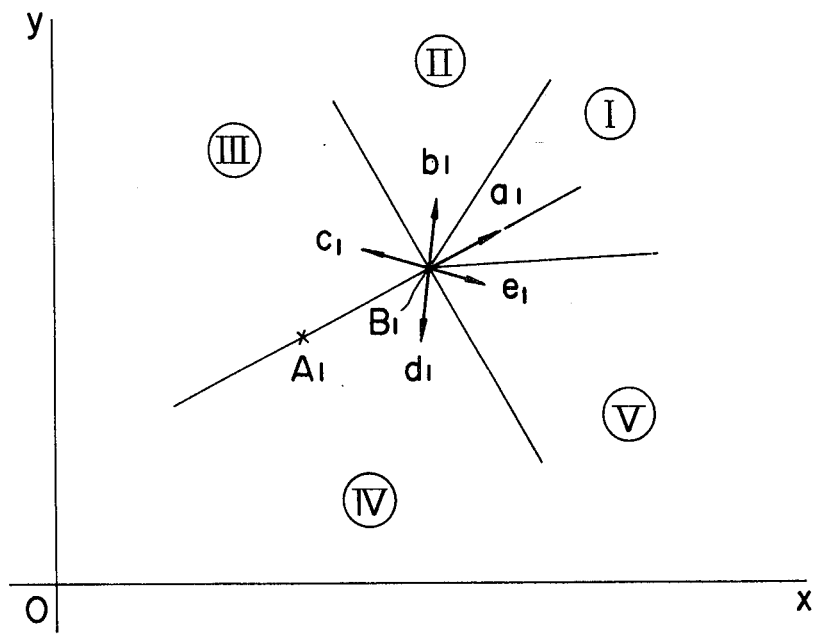

FIG. 14 shows combinations of the above movements and decisions. As will be seen from FIG. 14, the plane is divided into five regions Ⓘ to Ⓥ in the same manner as in FIG. 13. In FIG. 14, five of the eight directions correspond to the regions Ⓘ to Ⓥ, respectively, as indicated by arrows. Assume that the tip of the arm has now moved from a position $A_1$ to $B_1$ in the direction of the arrow $a_1$. If it is known that a desired position is in the region Ⓘ, then the tip of the arm is similarly moved in the direction of the arrow $a_1$. If the desired position lies in the region Ⓘ, the tip of the arm is moved in the direction of the arrow $b_1$; in the case of the desired position lying in the region Ⓘ, the tip of the arm is moved in the direction of the arrow $c_1$; in the case of the desired position lying in the region Ⓘ, the tip of the arm is moved in the direction of the arrow $d_1$; and in the case of the desired position lying in the region Ⓥ, the tip of the arm is moved in the direction of the arrow $e_1$.

Figure 15:
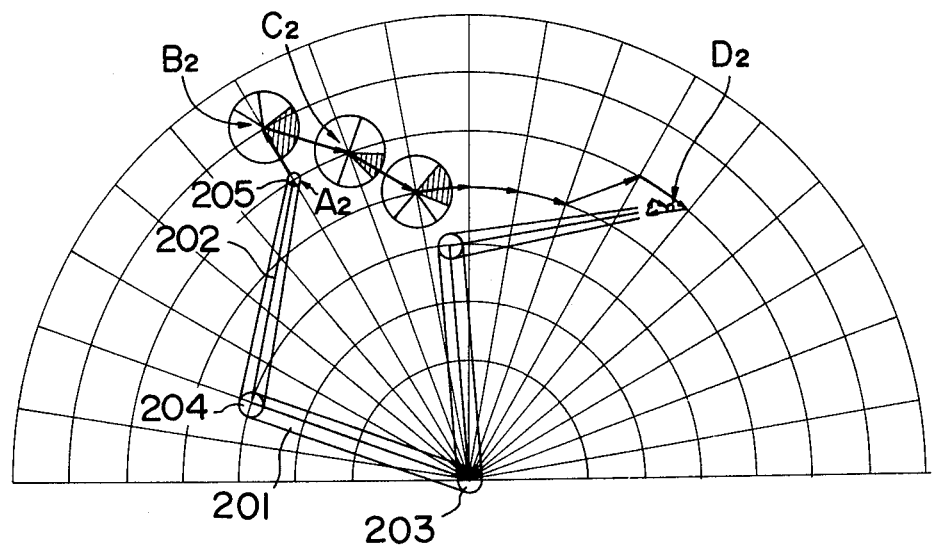
FIG. 15 shows how to position the tip of the two-joint arm.

FIG. 15 illustrates an example in which the two-joint arm is continuously moved by the method described above. In FIG. 15, reference character $A_2$ indicates a first position of the arm tip; and $D_2$ is a desired position. Basically, the arm tip is moved first from the position $A_2$ to a position $B_2$ in an arbitrary direction. Then, the coordinates of the positions $A_2$ and $B_2$ are read out by a TV camera and stored in a processor and it is decided by the processor in which one of the five regions the desired position lies. In this case, since the desired position $D_2$ lies in the hatched region, the arm tip is then moved to a position $C_2$ in this region. And, the plane is divided into five regions about the position $C_2$. Thus, the tip of the arm gradually approaches to the desired position $D_2$. As this occurs, the angle between subsequent intermediate positions is constant. In this way, the tip of the arm approaches the desired position but does not converge thereon; hence, the following algorithm is employed.

1. Except for a first decision, there is no possibility of such a decision that $\theta$ is $-\pi/2 < \theta < \pi/2$ unless the tip of the arm passes by the desired position while positively approaching it, so that when the decision of $-\pi/2 < \theta < \pi/2$ is made, the rotational angle of the arm is reduced by half.

2. If the decision of $-\pi/2 < \theta < \pi/2$ is given while the tip of the arm is turned through a minimum unit of its rotational angle, it is determined that the tip of the arm has converged on the desired position and the arm is stopped.

By the use of the abovesaid two means, the tip of the arm can be positioned at a place the closest to the desired position or at a place spaced one block apart therefrom.

Incidentally, by the use of the following means 2', the tip of the arm can be positioned at a point the closest to the desired position.

2'. If the decision of $-\pi/2 < \theta < \pi/2$ is given while the tip of the arm is turned through a minimum unit of its rotational angle, the coordinates of the two positions on which the decision is based are stored and the arm is turned through the same angle and the coordinates of the standstill position of the arm are stored. And the distance from the desired position to these three positions are calculated and the tip of the arm is positioned at that one of the three positions which is the nearest to the desired position.

Figure 16:
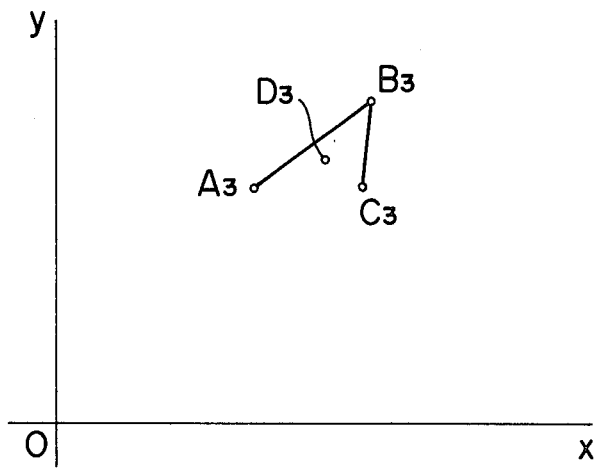
FIG. 16 shows how to position the tip of the arm at a place nearest to a desired position.

FIG. 16 shows the positioning of the arm tip by the abovesaid means 2'. In FIG. 16, $A_3$ is the last position but two; $B_3$ the last position but one; $C_3$ is the last position; and $D_3$ is the desired position. In this case, since the position $C_3$ is the closest to the desired position $D_3$, the arm tip is stopped at the position $C_3$.

Figure 17:
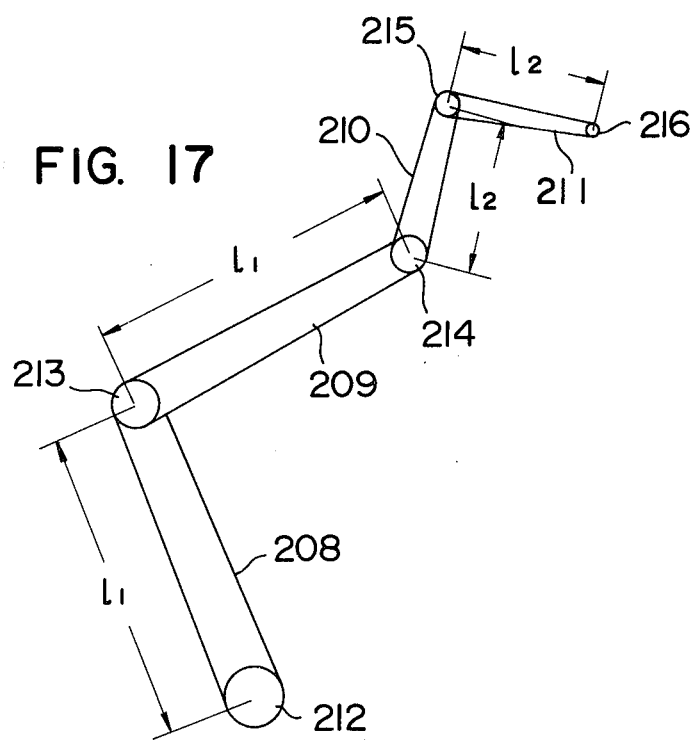
FIG. 17 is a plan view illustrating a multi-joint (four-joint) arm composed of two equal-length two-joint arms.

Next, a description will be given, with reference to FIG. 17, of a four-joint arm. In FIG. 17, reference numerals 208, 209, 210 and 211 indicate arms; and 212, 213, 214 and 215 designate joints. The arms 208 and 209 are of the same length $l_1$ and the arms 210 and 211 of the same length $l_2$. An advantage of this four-joint arm is that highly accurate positioning is possible over a wide range. In general, the multi-joint arm performs positioning of its tip by turning each joint, so that when a measurable minimum angle (an angle through which the arm is movable by a minimum unit) is predetermined, the positioning accuracy of its tip decreases with an increase in the length of the arm. In contrast thereto, when the arm is short, the positioning accuracy of the tip is high but the range of positioning is reduced. Then, in this example, the lengths $l_1$ of the two arms 208 and 209 are increased to enlarge the range of positioning, while the lengths $l_2$ of the two arms 210 and 211 are decreased to ensure highly accurate positioning. The algorithm employed in this case is as follows: At first, the coordinates of the joint 214 are recognized and the joint 214 is positioned after changing the angles of the arms 208 and 209 at the joints 212 and 213 by the same method as in the case of the two-joint arm until a desired position comes within the reach of the arms 210 and 211. Then, the coordinates of the tip 216 are recognized with the joint 214 fixed (the angles of the arms 208 and 209 at the joints 212 and 213 being fixed) and the arms 210 and 211 are turned to position the tip 216.

Figure 18:
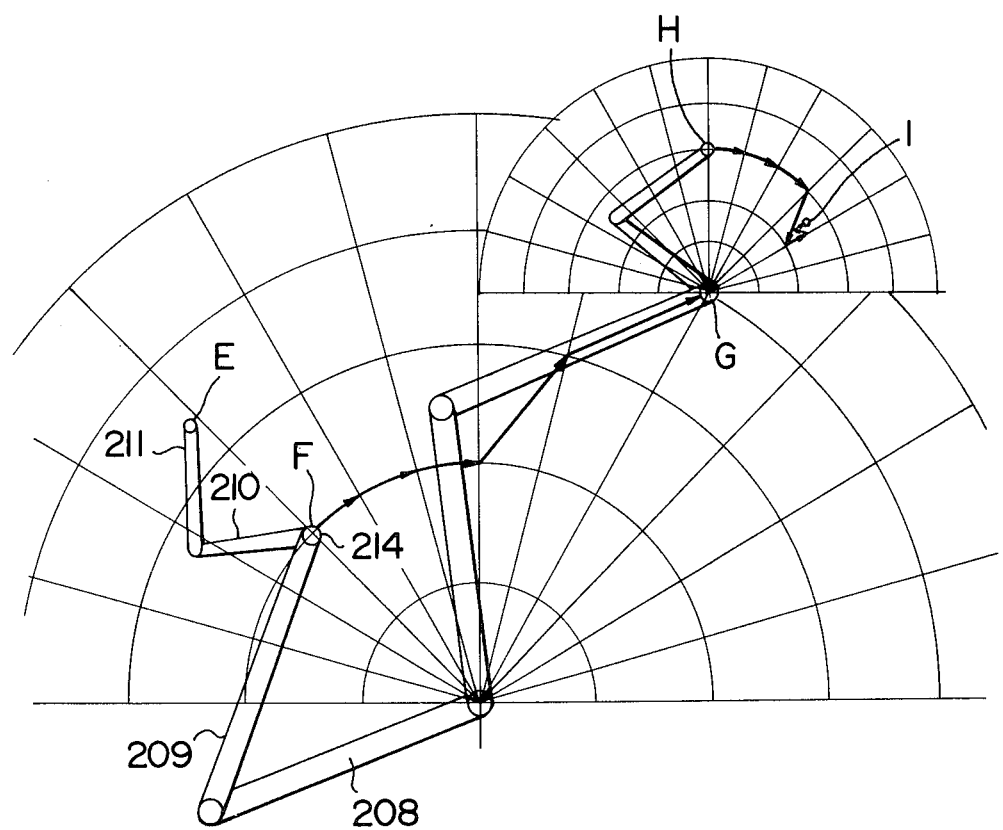
FIG. 18 shows how to position the tip of the multi-joint arm.

FIG. 18 illustrates the process of positioning by the above two-step operation. In FIG. 18, reference character E indicates the initial position of the tip 216; F designates an initial position of the joint 214; G identifies the final position of the joint 214 at the end of the first-step positioning (by turning only the arms 208 and 209); H denotes the position of the tip at the end of the first-step positioning; and I represents a desired position. It is evident that the abovesaid method is also applicable to the case where the arms of each pair have different lengths.

In FIG. 10, reference numeral 217 indicates a TV camera for recognizing the arm tip, in concrete terms, a light emitting element 218; and 219 designates a control circuit (including a minicomputer) into which the recognition is applied as an input. The arms 201 and 202 are driven according to the decision result of the control circuit 219. In this case, since the minicomputer performs calculations of the sum, difference and product of integers as shown in the expressions (2), (4), (6) and (8)

for the decision, the calculations are easy and the influence of an error can be lessened.

As has been described in the foregoing, the present invention introduces advantages of open-loop control and employs, in combination therewith, feedback control for preventing deviations of the locus of the tip of the second arm; hence, it is possible to obtain an accurate operating locus. Further, optimum control can be achieved by using, as the waveform of a force to the first arm, a bang-bang force pattern having a switching point as described previously with respect to FIGS. 5 and 6.

Of course, locus control of a multi-joint arm can be performed by applying the present invention to each of two-joint arms into which the multi-joint arm is divided.

It will be apparent that many modifications and variations may be effected without departing from the scope of the novel concepts of this invention.

What is claimed is:

1. An arm locus control method, comprising the steps of: driving a first arm of a two-joint arm under open-loop control, and placing a second arm under feedback control by using a control signal proportional to the product of a first value obtained by substituting a coordinate value of a tip of the second arm for a variable in a function representing a locus along which the tip of the second arm is to follow and a second value obtained by substituting the coordinate value of the tip of the second arm for a variable in a derivative of the function.

2. A method according to claim 1, wherein the coordinate value is determined by detecting the position of the tip of the second arm from the rotational angle of each arm.

3. A method according to claim 1, wherein the coordinate value is determined by detecting the position of the tip of the second arm by using a position recognizing system.

4. A method according to claim 1, wherein the step of driving the first arm is conducted by driving the first arm by a bang-bang driving force, said bang-bang driving force being determined by establishing an equation of motion representing the behavior of the arm; expressing a solution obtained by solving the equation in a positive direction of time based on the assumption that the first arm is driven from its initial position to its final position and a solution obtained by solving the equation in a negative direction of time based on the assumption that the first arm is driven from its final position to the initial position in a phase plane representing a rotational angle and an angular velocity; and using the intersection of these loci to obtain a positive-negative switching point for the bang-bang driving force.

5. A method according to claim 1, wherein an additional two-joint arm having third and fourth arms is connected at the tip-end of the second arm, and further comprising the steps of driving the third arm under open-loop control and placing the fourth arm under feedback control.

6. A method according to claim 5, wherein the step of driving the first arm is conducted under bang-bang control and wherein the step of placing the second arm under feedback control is conducted by detecting the deviation of the tip of the second arm from a predetermined locus and by generating a feedback control signal to correct the deviation, both of these steps being completed before the steps of driving the third arm under open-loop control and placing the fourth arm under feedback control are initiated.

7. A method according to claim 1, further comprising the steps of dividing the plane of movement of the second arm into a plurality of regions formed by straight lines intersecting at the tip of the second arm, determining the region in which said predetermined locus is located, and moving the tip of the second arm into that region.

8. An arm locus control method, comprising the steps of:

driving a first arm of a two-joint arm under open-loop bang-bang control, and placing a second arm under feedback control by detecting the deviation of the tip of the second arm from a predetermined locus, and producing a feedback control signal to correct the deviation by generating a signal that is proportional to the product of a function representing a straight line along which the tip of the second arm is to be moved and a partial derivative of that function.

9. A method according to claim 8, further comprising the steps of dividing the plane of movement of the second arm into a plurality of regions formed by straight lines intersecting at the tip of the second arm, determining the region in which said predetermined locus is located, and moving the tip of the second arm into that region.

* * * * *

UNITED STATES PATENT AND TRADEMARK OFFICE
CERTIFICATE OF CORRECTION

PATENT NO. : 4,488,242

DATED : Dec. 11, 1984

INVENTOR(S) : Fumio Tabata et al

It is certified that error appears in the above-identified patent and that said Letters Patent is hereby corrected as shown below:

Column 7, line 8, "$\lambda_1$" should be --$\theta_1$--.

Column 9, line 55, "$\tilde{\pi}2$" should be --$\pi/2$--.

Signed and Sealed this

Seventeenth Day of September 1985

[SEAL]

Attest:

DONALD J. QUIGG

*Attesting Officer*

*Commissioner of Patents and Trademarks—Designate*